United States Patent
Lancaster et al.

(10) Patent No.: US 8,526,705 B2
(45) Date of Patent: Sep. 3, 2013

(54) DRIVEN SCANNING ALIGNMENT FOR COMPLEX SHAPES

(75) Inventors: Simon Lancaster, Gloucester (CA); Andrew Davidson, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1111 days.

(21) Appl. No.: 12/482,246

(22) Filed: Jun. 10, 2009

(65) Prior Publication Data

US 2010/0316280 A1    Dec. 16, 2010

(51) Int. Cl.
*G06K 9/00* (2006.01)

(52) U.S. Cl.
USPC ........... 382/141; 382/143; 382/151; 382/154; 382/276; 382/294; 356/237.1; 356/239.1; 356/239.7; 356/237.2; 356/237.3

(58) Field of Classification Search
None
See application file for complete search history.

(56) References Cited

U.S. PATENT DOCUMENTS

| | | | | |
|---|---|---|---|---|
| 5,208,763 A * | 5/1993 | Hong et al. | | 702/95 |
| 5,673,334 A * | 9/1997 | Nichani et al. | | 382/143 |
| 6,064,759 A * | 5/2000 | Buckley et al. | | 382/154 |
| 6,246,468 B1 * | 6/2001 | Dimsdale | | 356/4.02 |
| 6,256,038 B1 * | 7/2001 | Krishnamurthy | | 345/419 |
| 6,748,112 B1 | 6/2004 | Nguyen et al. | | |
| 6,973,207 B1 * | 12/2005 | Akopyan et al. | | 382/143 |
| 7,206,080 B2 * | 4/2007 | Kochi et al. | | 356/611 |
| 7,346,999 B2 * | 3/2008 | Ingram et al. | | 33/554 |
| 7,394,530 B2 * | 7/2008 | Budd | | 356/237.1 |
| 7,814,441 B2 * | 10/2010 | Bae et al. | | 345/420 |
| 8,203,576 B2 * | 6/2012 | Chang et al. | | 345/644 |
| 2004/0234122 A1 * | 11/2004 | Kochi et al. | | 382/154 |
| 2008/0040080 A1 * | 2/2008 | Bae et al. | | 703/1 |
| 2008/0316501 A1 | 12/2008 | Hirata et al. | | |
| 2010/0061622 A1 * | 3/2010 | Chang et al. | | 382/154 |
| 2010/0194749 A1 * | 8/2010 | Nightingale et al. | | 345/424 |

FOREIGN PATENT DOCUMENTS

| | | |
|---|---|---|
| JP | 62-142209 | 6/1987 |
| JP | 10-38543 | 2/1998 |
| JP | 2001-221618 | 8/2001 |

* cited by examiner

*Primary Examiner* — Matthew Bella
*Assistant Examiner* — Jason Heidemann
(74) *Attorney, Agent, or Firm* — Womble Carlyle Sandridge & Rice LLP

(57) ABSTRACT

Methods and systems for accurately determining dimensional accuracy of a complex three dimensional shape are disclosed. The invention in one respect includes determining at least a non-critical feature and at least a critical feature of the 3-D component, determining a first datum using at least the non-critical feature, aligning the first datum to at least a portion of a reference shape, determining a second datum corresponding to the critical feature subsequent to the aligning, and determining the dimensional accuracy of the 3-D component by comparing the second datum to another portion of the reference shape.

17 Claims, 11 Drawing Sheets

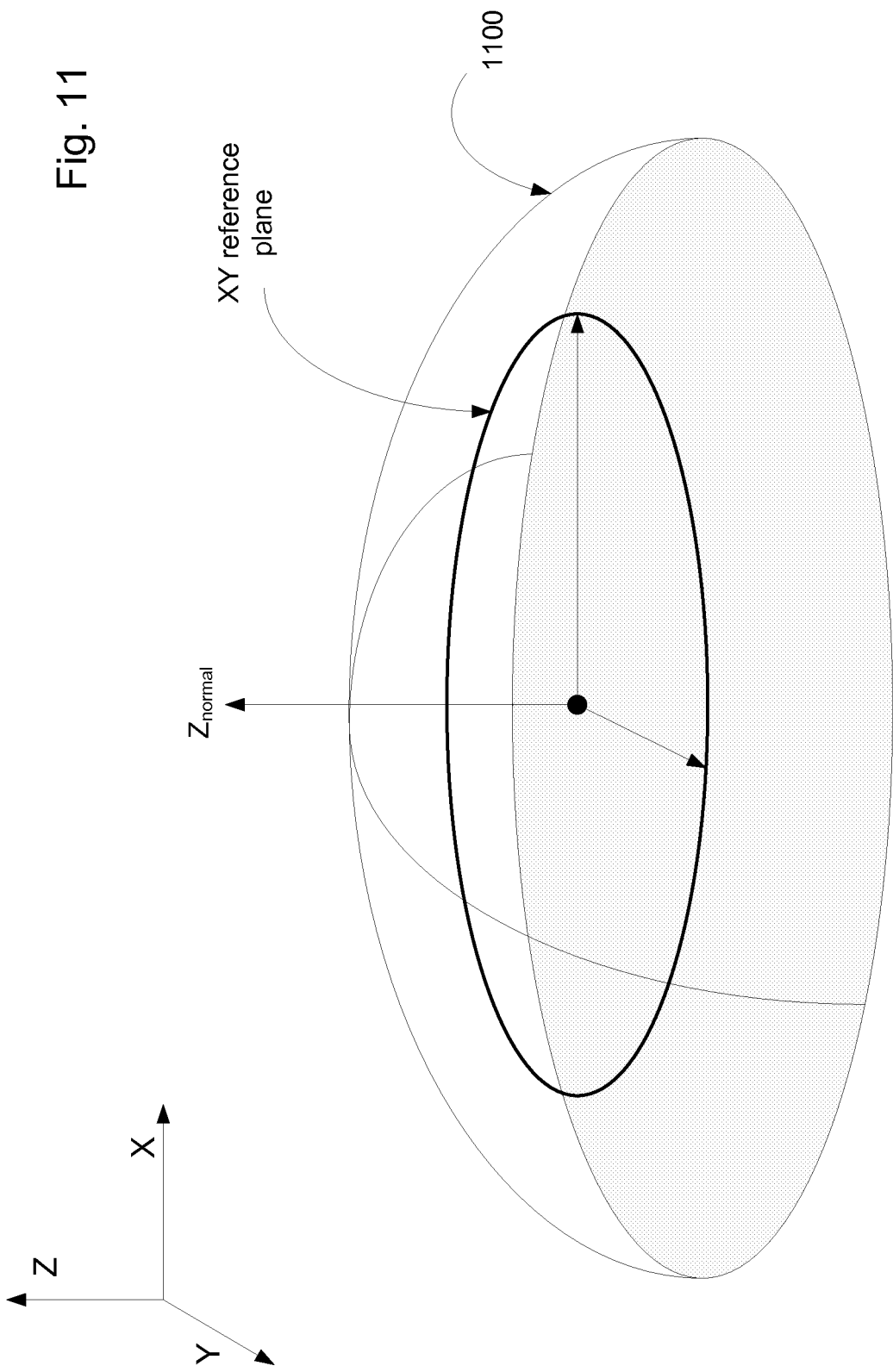

DRIVEN SCANNING ALIGNMENT FOR COMPLEX SHAPES

BACKGROUND OF THE INVENTION

1. Field of the Invention

This invention relates generally to non-destructive inspection and, more particularly, to dimensional inspection of fabricated components. In particular, inspection and measurement of complex shapes having substantially all spline surfaces and therefore no available reference datum.

2. Description of the Related Art

Dimensional inspection techniques are used in many applications where the non-destructive evaluation (NDE) of a work piece or component is desired. Known inspection techniques include a visual or manual inspection to facilitate determining a service condition of a component. A knowledgeable and skilled technician may be able to ascertain the worthiness of a particular component for replacement using visual or manual inspection, however visual or manual inspection may not be accurate enough for all components nor repeatable for quality verification purposes. Accordingly, many industrial applications require accurate and rapid measurement of the 3-D shapes of objects. Representative applications of 3-D shape measurement include reverse engineering, 3-D replication, inspection and quality control. In most of these applications, users need to construct 3-D point clouds that correspond to the object's surface by performing measurement on the object's surfaces. Manufacturing industry needs a fast inspection process that can measure and analyze various 3-D features on the part and determine if a feature is within the tolerance specifications or not. The measurement scheme needs to be adequately accurate to eliminate measurement errors. Measurement errors can lead to erroneous inspection that results in an acceptable part being rejected and a defective part being accepted. Hence, both inspection speed and accuracy are equally important.

In particular, precision manufacturing has always required a great deal of dimensional accuracy. Particularly challenging to the precision manufacturing industry is the need to measure complex shapes. Traditionally, complex shapes had to be measured by physical contact using coordinate measurement machines, or CMMs. In order to obtain the requisite dimensional data, CMMs move tiny contact probes around the surface of the object being measured and build up a set of measurement points that are used to ensure that the object measured is within certain dimensional tolerances. However, the measuring process is slow and cannot be used for real-time control. Moreover, when a large number of points are needed to characterize a surface, the data-acquisition time becomes prohibitive since with CMM data acquisition is limited to a few points per second. Moreover, CMMs do not permit in-process measurement of surfaces which would let machine operators measure a surface before a process and make any necessary changes before completing the entire manufacturing loop.

On the other hand, optical-based techniques are usually very fast. Therefore, a possible way to perform the 3-D inspection is to use digital cameras to construct a dense point cloud (e.g., points spaced less then 0.25 mm apart) corresponding to the part being inspected and then analyze the point cloud to determine if it meets the tolerance specifications. But accuracy associated with the conventional camera based inspection techniques has not been very high in the area of measurement of geometrically complex 3-D shapes. Unfortunately, however, in those cases where the shape has substantially all spline surfaces, there are effectively no regular surface or edges that can successfully be used as a reference datum. Therefore, since a reference datum is not available, relative measurements where one compares a measured shape to a reference (ideal) are difficult if not impossible.

Therefore, improved techniques for measuring three dimensional complex shapes where no reference datum is available is required.

SUMMARY OF THE INVENTION

The invention relates to determining the dimensional accuracy of a complex three dimensional shape. In the described embodiments, the complexity of the shape can be related to the fact that the shape has substantially all spline surfaces such that there are effectively no regular surface or edges that can successfully be used as datums to provide reference points.

In one embodiment, a method for providing a virtual datum used for determining dimensional accuracy of a three dimensional (3-D) object having a complex shaped surface S in relation to a reference image of the 3-D object is described. The method can be carried out by at least performing the following operations. Determining a non critical feature of the 3-D object, determining a critical feature of the 3-D object, determining a preliminary datum based upon at least one non critical feature, determining the virtual datum based upon the preliminary datum and the critical feature, obtaining a scanned image of the 3-D object, and aligning the scanned image and the reference image using the virtual datum.

In another embodiment, a system for determining the dimensional accuracy of a three dimensional (3-D) component having a spline curved surface S is described. The system includes at least a processing unit, a scanning unit in communication with the processing unit arranged to scan a surface of the 3-D component and provide scanning data, a data storage unit arranged to store at least a reference image data and the scanning data, and a user interface arranged to receive a user input from a user. During operation of the system, the user uses the user input to provide an indication of at least a non-critical feature of the 3-D component and at least a critical feature of the 3-D component to the processor. A first datum is then selected based upon at least the non-critical feature. The non-critical feature is used by the processor to align the 3-D component to an associated portion of a reference image of the 3-D component using data stored in the data storage unit. In response to the aligning, a second datum is then determined corresponding to the critical feature. The processor uses the first and the second datum to align the reference image data to the scanned image data. The aligned data is then compared to each other to determine the dimensional accuracy of the 3-D object.

In yet another embodiment, a system for determining the dimensional accuracy of a 3-D object having a complex shape is described. The system includes at least a chuck for securing the 3-D object, a scanning device for scanning a surface of the 3-D object while secured in the chuck, wherein the scanning device generates scanned image data, a computing system having at least a user interface, a processor and a memory, wherein the memory stores reference image data corresponding to a reference image of the 3-D object. The scanning device sends the scanned image data to the memory for storage and registers the scanned image data to the reference image data using a virtual datum derived from at least a critical and a non critical feature of the 3-D object. The computing system determines the dimensional accuracy by comparing the scanned image data to the reference image data.

In still another embodiment, a method of determining a virtual datum used for evaluating the dimensional accuracy of an object having a complex shape is described. The method can be carried out by at least the following operations. Obtaining scanned image data and the reference image data of the object. The surface of the scanned image is apportioned into a plurality of regions and the surface of the reference image is apportioned into a plurality of regions each corresponding to one of the plurality of scanned image regions. The corresponding regions of the scanned image and the reference image are compared to each other and based on the comparing, a closest matching region or regions are identified. A preliminary datum is selected from the identified closest matching region and in combination with a critical feature, the virtual datum is determined.

Computer readable medium for storing computer code used by a processor for determining dimensional accuracy of a three dimensional (3-D) object having a complex shaped surface S in comparison to a reference image of the 3-D object wherein the surface S is formed of essentially all spline curves is disclosed. The computer readable medium includes at least computer code for determining a non critical feature of the 3-D object, computer code for determining a critical feature of the 3-D object wherein the critical feature is based upon a critical design/manufacturing consideration of the 3D object, computer code for selecting a preliminary datum based upon at least one non critical feature, computer code for determining a virtual datum based upon the preliminary datum and the critical feature; computer code for obtaining a scanned image of the 3-D object, computer code for aligning the scanned image and the reference image using the virtual datum; and computer code for comparing the scanned image and the reference image.

BRIEF DESCRIPTION OF THE DRAWINGS

FIG. 11 illustrates a representative complex shape and the corresponding virtual datum comprising an XY reference plane and the critical dimension Z in accordance with a described embodiment.

DETAILED DESCRIPTION OF SELECTED EMBODIMENTS

Reference will now be made in detail to selected embodiments an example of which is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as can be included within the spirit and scope of the invention as defined by the appended claims.

The dimensional accuracy of any object can be determined by scanning the object (using either contact or non-contact methods) to create a set of measured point values (referred to as a point cloud) that can represent a scanned image of the object. The set of measured point values can then be compared to a reference set of values representing a reference image of the object. The reference image can be based upon the actual measurements of a model of the object, CAD drawings, and so on. However in order to compare the scanned image and the reference image, the two images must be properly aligned to each other using a reference datum. For example, if the reference image has a linear or planar surface feature or a curved surface feature having a constant radius of curvature, then that feature can usually be relied upon to provide the requisite reference datum. However, for those objects having a surface or surface features that have a constantly varying radii of curvature (referred to as a spline surface), then there is in all likelihood no reference datum that can be used to register the scanned and reference images.

Figure 1:
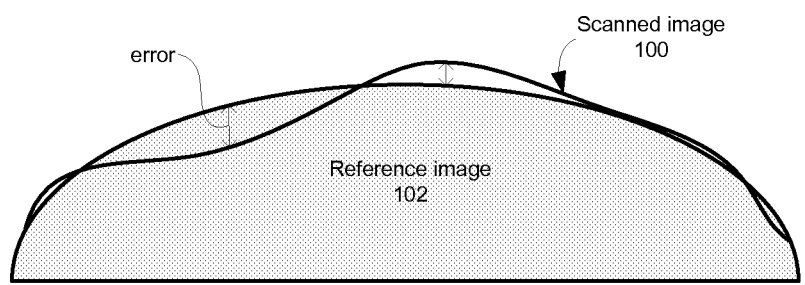
FIG. 1 shows matching of a scanned object having a complex shape to a reference shape (such as a CAD image).

For example, FIG. 1 shows matching of a scanned object 100 having a complex shape to a reference shape 102 (such as a CAD image). As shown, the comparison is carried out using a best fit algorithm based on, for example, least squares differences between the reference 102 and scanned object 100. Since the least squares analysis is calculated in all dimensions, the location of real defects are obscured since the defects are 'smeared' by averaging since there is no reference that can be used to align the two shapes. Therefore, it is difficult if not impossible to determine those parts of a measured shape that should be considered defective or otherwise out of acceptable tolerance limits. Usually, it is assumed that those parts of the shape that coincide with the reference, or lie within the tolerance limit, are acceptable. Those parts that lie beyond the tolerance are defective. This means, however, that the defects should be recognized prior to the shape comparison whose goal is, in turn, defect recognition itself. The task is therefore to find the superposition of the measured and the reference shapes that best corresponds to the expectations of a human observer: a 'correct' part should be close to the reference; a 'defective' part should stand out clearly.

The embodiments described herein describe at least a system and a method that teaches a design driven alignment protocol suitable for scanning of shapes having a spline surface. In the described embodiments, core design and/or manufacturing requirements can be used to identify a virtual datum that can be used to align the scanned image of a manufactured test object and a reference image in order to evaluate the dimensional accuracy of the test object. Such core design and/or manufacturing requirements can include co-ordinate and critical feature selection based upon the anticipated end use of the test object. For example, if the test object is to be fitted to another component then a critical design/manufacturing consideration is the fitment requirement in the fitment dimension (for example, in order to properly stack one component on top of another component, the critical dimension is the stacking dimension whereas a non-critical dimension is the plane on which the components rest, therefore, the virtual datum includes the resting plane and at least one point in the stacking dimension).

Other considerations that can be used in determining that portion of the test object that can be considered as the virtual datum can include the properties of the manufacturing process used to create the test object. In this way, those regions fabricated using the most repeatable manufacturing process (computer numerical control, or CNC, in contrast to deep drawn) can be considered more suitable for selection as a preliminary datum that providing a more reliable "starting point". For example, a portion of the test object known to be manufactured using less reliable deep drawn process is a less suitable candidate for selection as a preliminary datum than a region fabricated using more reliable and repeatable CNC process. Therefore, given the choice, the CNC fabricated region will be selected over the deep drawn region providing a more stable and reliable starting point than would otherwise be possible. Once a preliminary datum has been identified, then the scope of the alignment can be determined using both critical and non-critical features. The critical features can be those features based upon the knowledge of the part in assembly (i.e., will the part be used to fit with another part, in which case, as above, a feature in the fitness dimension can be considered critical).

In the context of the described embodiments, a reference point set represents the 'ideal' shape can result either from precise measurement of a physical reference shape, or from computation based on a mathematical description (specification) of the reference shape. The reference point set is complete (all parts of the surface are represented), dense (any region is densely covered by the points) and precise (the measurement/computation is precise). A measured point set represents the measured or scanned shape of the object being measured. It should be noted that the measured point set may be incomplete, less dense, noisy, and distorted by defects whose deviation from the reference shape exceeds both noise level and tolerance.

Figure 2:
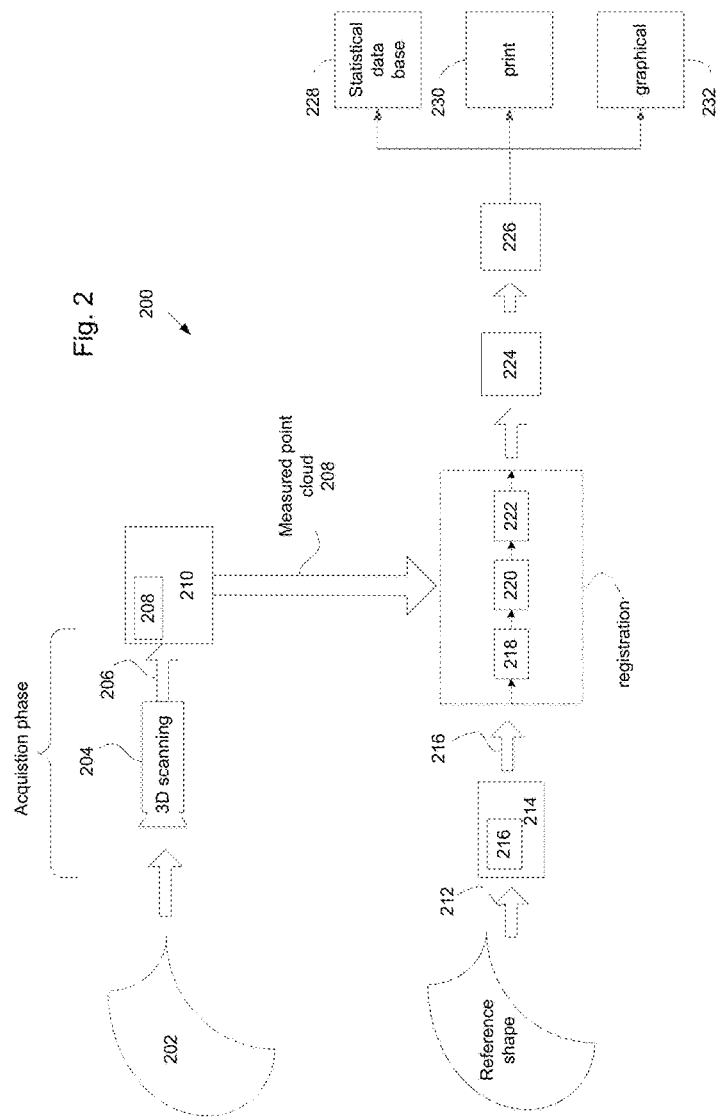
FIG. 2 is a block diagram of process for finding shape deformations according to one embodiment of the present invention.

FIG. 2 is a block diagram of process for finding shape deformations according to one embodiment of the present invention. Process 200 can be adapted to inspect and determine deformations of object 202. Deformations may include tilt, bend, twist or warp in the surface shape of object 202 when compared to a CAD model or to other representations of the ideal configuration of object 202. In one embodiment of the invention, object 202 comprises a housing for a portable electronic product such as a portable media player, computer mouse, cell phone, etc. It should be noted however, that one skilled in the art will appreciate that the method may be used to find shape deformations in any object having essentially all smooth, spline surfaces.

In order to be properly inspected, object 202 can be positioned within the sensing range of imaging device 204. Imaging device 204 can obtain scanned image 206 as a collection of points called a measured points cloud 208 and stores it in an image data store 210 for further processing. The measured points cloud 208 is a complete representation of scanned object 202. The acquisition phase can be performed with non-contact techniques to ensure high performances in terms of speed. Typically, the point cloud corresponding to an object having a complex shape can be represented by millions of points. However, due to processing and/or memory limitations, it may be advisable to reduce this large amount of data using well known data reduction methods (such as, for example, decimation) whereby only specific data points are retained. Using such techniques a point cloud originally containing millions of data points can be successfully reduced to a point cloud on the order of a million or fewer data points.

Imaging device 204 can be a coordinate measurement machine (CMM) which translates and rotates a probe around the object 202 and records a plurality of contact points on the surface of object 202. However, if the length of time required to scan the object 202 can take an amount of time substantially longer than desired in a production oriented environment, imaging device 204 can take the form of a non-contact range sensor such as a digital camera that can measures the distance from the camera to the surface of the object 202. Thus the image provided by imaging device 204 is referred to as a range image. Accordingly, imaging device 204 can take the form of a full field, non-contact, laser line grating range sensor mounted on a translation stage to acquire surface data.

Full field, non-contact range sensors suitable for use as imaging device 204 are currently readily available from a number of commercial sources that are based on laser line grating and stereo triangulation. Another suitable range sensor technology is based on single laser line scan and rotation of the object. Other suitable range sensors are based on phased-shift Moire and white light. One embodiment of the invention employs a plurality of range sensors mounted on translation stages to acquire dense surface data, and further includes a rotation stage to rotate the object 202. It should be noted that those of ordinary skill in the art will recognize other imaging devices such as x-ray and Magnetic Resonance Imaging (MRI) devices can provide scanned image for use in accordance with the present invention. Moreover, in those situations where the complex shapes include hidden spaces or other complications that would prevent the use of camera based systems, using scanning technologies such as phased-array ultrasonics and be used to implement the described embodiments. Accordingly, the invention is not intended to be limited to imaging devices which provide range images.

Therefore, during visual inspection, three dimensional data (i.e., point cloud) 208 are obtained by scanning the surface of 202 with imaging device 204 and stored in memory 210. Reference image 212 can be stored in reference image memory 214 as reference point cloud 216. Similar to measure point cloud 208, reference point cloud 216 can be formed of digital data. The reference point cloud 216 can be compared to the measured point cloud 208 corresponding to the scanned object 202 in order to detect deformations in object 202. In the described embodiment, a reference image comprises ideal characteristics of object 202 including ideal shape data. There exist several types of reference images suitable for use in the present invention. Among them are reference images created prior to scanning the object to be inspected, reference images derived from other products shaped similarly to the object to be inspected, reference images derived from known defect-free products, and reference images generated from design data, such as CAD models.

In order to compare the reference data to the scanned data, a procedure referred to a registration must be performed. Registration is defined as the process of aligning a scanned image with a reference image. The registration process generally comprises two steps. The first step is to determine corresponding points, or features of the scanned image and the reference image. In the case where object 202 does not have edges or surfaces that can be used as a reference datum, then a virtual datum must be determined at 218. Once a virtual datum has been established and corresponding points and/or features of the scanned and reference image are established (220), the second step is transforming the input and reference image to a common coordinate system (222). The transformation to a common coordinate system is typically a geometric transformation and includes translations, rotations, and scale changes. The transformation step positions the two images with respect to one another so that corresponding points in the images represent the same point on the object. In other words, registration involves orienting a first image with respect to a second image so as to make all alignment parameters of the first image the same as corresponding alignment parameters of the second image. However, on any grid, any geometric transformation results generally in points that do not any longer lie on the original grid. Therefore, suitable algorithms are required to interpolate the values at transformed points from the neighboring pixels. The high demands for position accuracy make image interpolation critical.

Finally, once the scanned image and reference image are properly registered, a post-registration comparison, or matching (224) of the reference image and the scanned image is carried out in order to determine differences which represent deviations of the scanned image from the reference image, or of the object's actual shape from the ideal shape as represented by the reference image. The results of the matching (224) can be reported (226) to, for example, a statistical data base (228), or visually reproduced in print (230), or graphically reproduced (232), or any combination.

The following description provides illustrative examples of providing a virtual datum for those objects having spline surfaces and therefore no reliable reference edge or surface.

Figure 3:
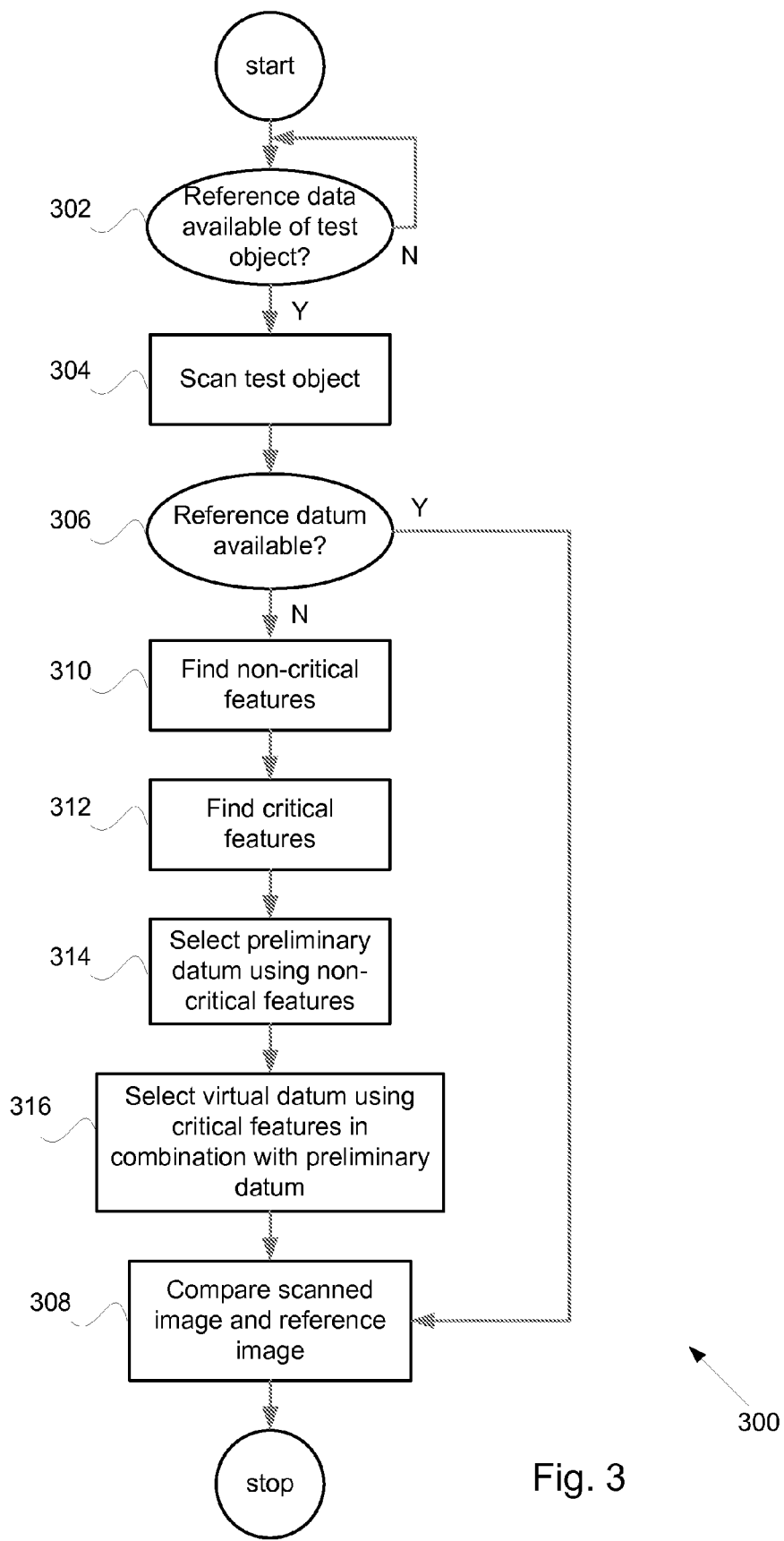
FIG. 3 shows a process for providing a virtual datum in accordance with the described embodiments.

FIG. 3 shows a process 300 for providing a virtual datum in accordance with the described embodiments. The process 300 can be carried out by determining at 302 if a reference image of the test object is available. The reference image can be, for example, a CAD drawing, previously measured model, etc. If the reference image is available, then at 304 the test object is scanned to form the scanned image. The scanning of the object can be based upon physical contact of the test object using for example a CMM, otherwise a non contact scanning can be used based upon, for example, optically obtaining the surface measurement values. In any case, if a reference datum is determined to be available at 306, then at 308 the scanned image and the reference image are compared along the lines discussed above with regards to FIG. 2, otherwise, a virtual datum is obtained starting at 310 by finding non critical features of the test object and at 312 by finding critical features of the object. The determination of the non critical features and critical features can be based in part upon both design and/or manufacturing knowledge that can include, for example, the reliability of a process used to manufacture or fabricate the test object, the end use of the test object, and the relationship of the test object to other components and so on.

Once the critical and non-critical features have been identified, a preliminary datum is determined at 314 using the non-critical features. The preliminary datum can be that region that most closely matches a corresponding region of the reference image. In addition, the preliminary datum can be associated with design and or manufacturing knowledge related to the repeatability of processing used to fabricate that region. Once the preliminary datum is selected, the virtual datum is determined using the preliminary datum and the critical feature at 316. The scanned image and reference image are compared at 308.

Figure 4:
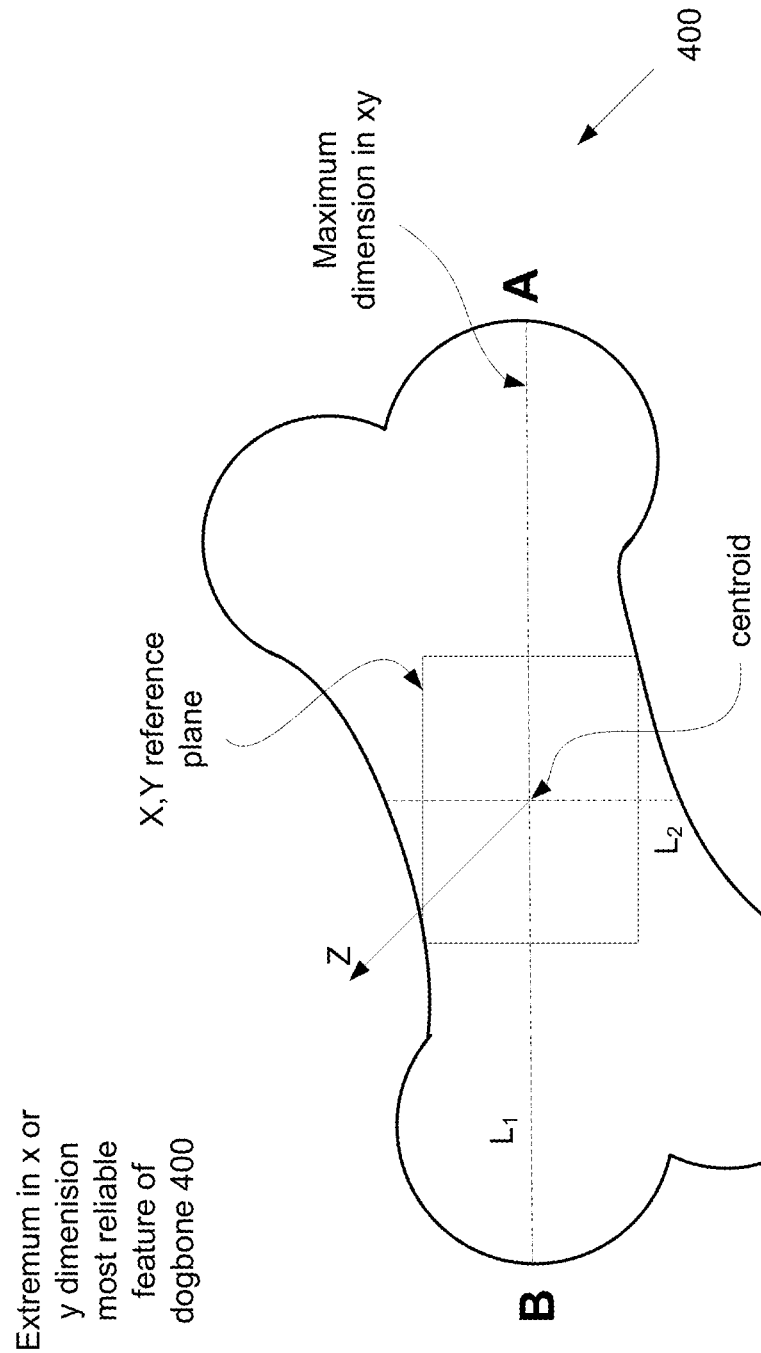
FIGS. 4-6 show different approaches to determining a preliminary and virtual datum for a test objects having various shapes in accordance with a described embodiment of the invention.
Figure 5:
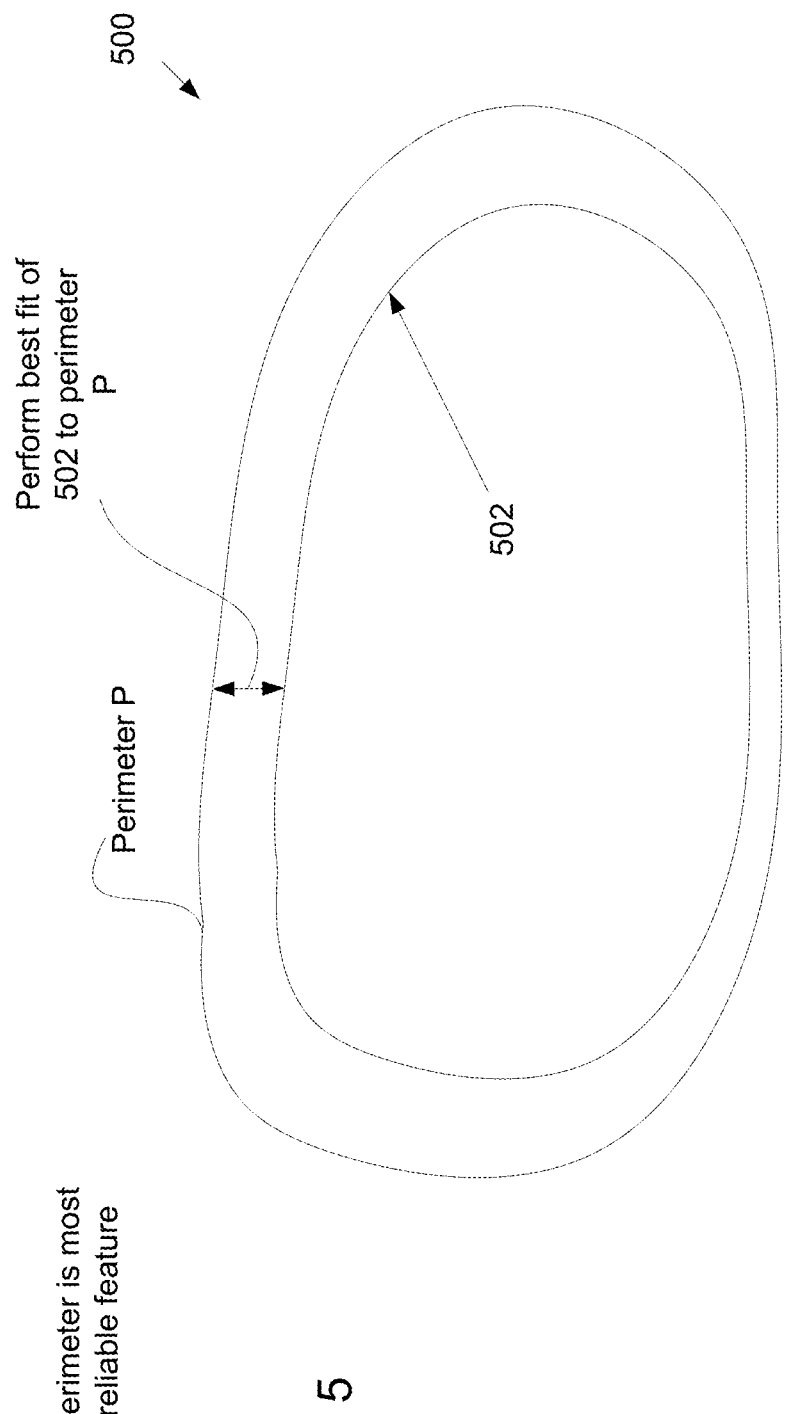
Figure 6:
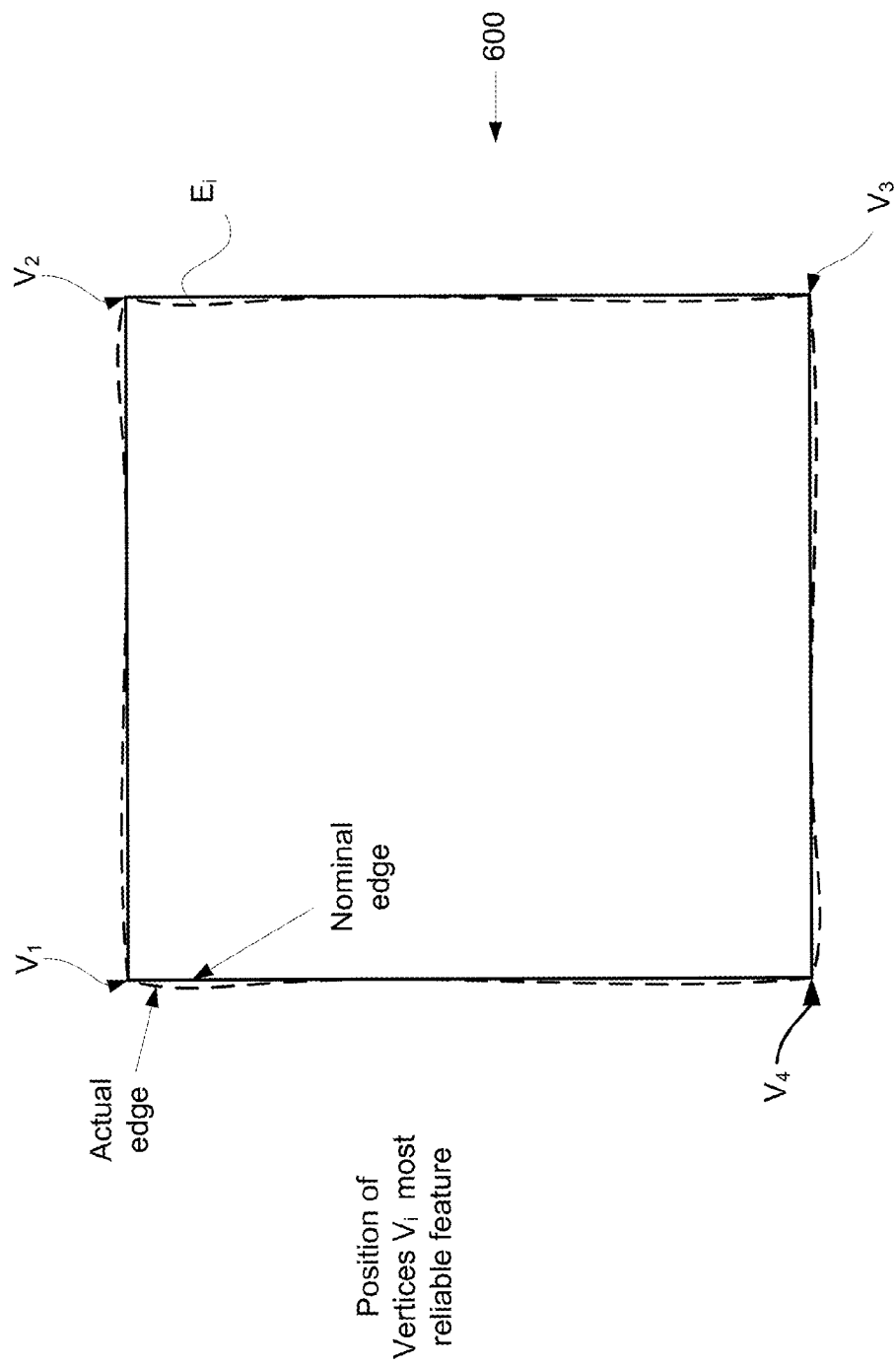

FIGS. 4-6 show different approaches to determining a preliminary and virtual datum for a test objects having various shapes in accordance with a described embodiment of the invention. FIG. 4 shows a two dimensional rendering of a 3-D "dogbone" shape 400. If as in this example, the critical dimension is in the Z direction, then the non critical datum can be an XY reference plane transecting the dogbone shape 400. It should be noted that although in the case shown in FIG. 4 the XY reference plane bi-sects the dogbone shape 400, it should be readily apparent that the reference XY plane can be placed in any appropriate location on the Z axis depending, of course, on the design and/or manufacturing considerations. In the instant example, the XY reference plane is that plane formed by the line $L_1$ drawn through the most distant points (A,B) of dogbone shape A. Line $L_2$ drawn perpendicular and at the center of line $L_1$ can be used to represent reference plane XY. In this case, the intersection of line $L_1$ and line $L_2$ can be located at the centroid of dogbone shape 400. Once reference plane XY is determined, a virtual datum can be created in the Z dimension (which had been heretofore determined to be the critical dimension) using point $Z_1$ and reference plane XY.

FIG. 5 shows the case where a shape 500 has a perimeter P that can be considered to be a critical feature. In this case, an interior shape 502 can be aligned to perimeter P using a best fit type algorithm. Such best fit algorithms can include, for example, a least squares analysis of the difference between interior shape 502 and perimeter P.

FIG. 6 shows another situation typical of manufacturing where a component 600 has well defined vertices $V_i$ but poorly defined edges $E_i$. In this example, the edges cannot be used as reliable reference datum. However, the vertices $V_i$ can be used to at least define a center point P.

Therefore, it is readily apparent from even the limited examples described above that whatever appropriate feature of a particular shape can be used to determine the virtual datum for that shape.

Figure 7:
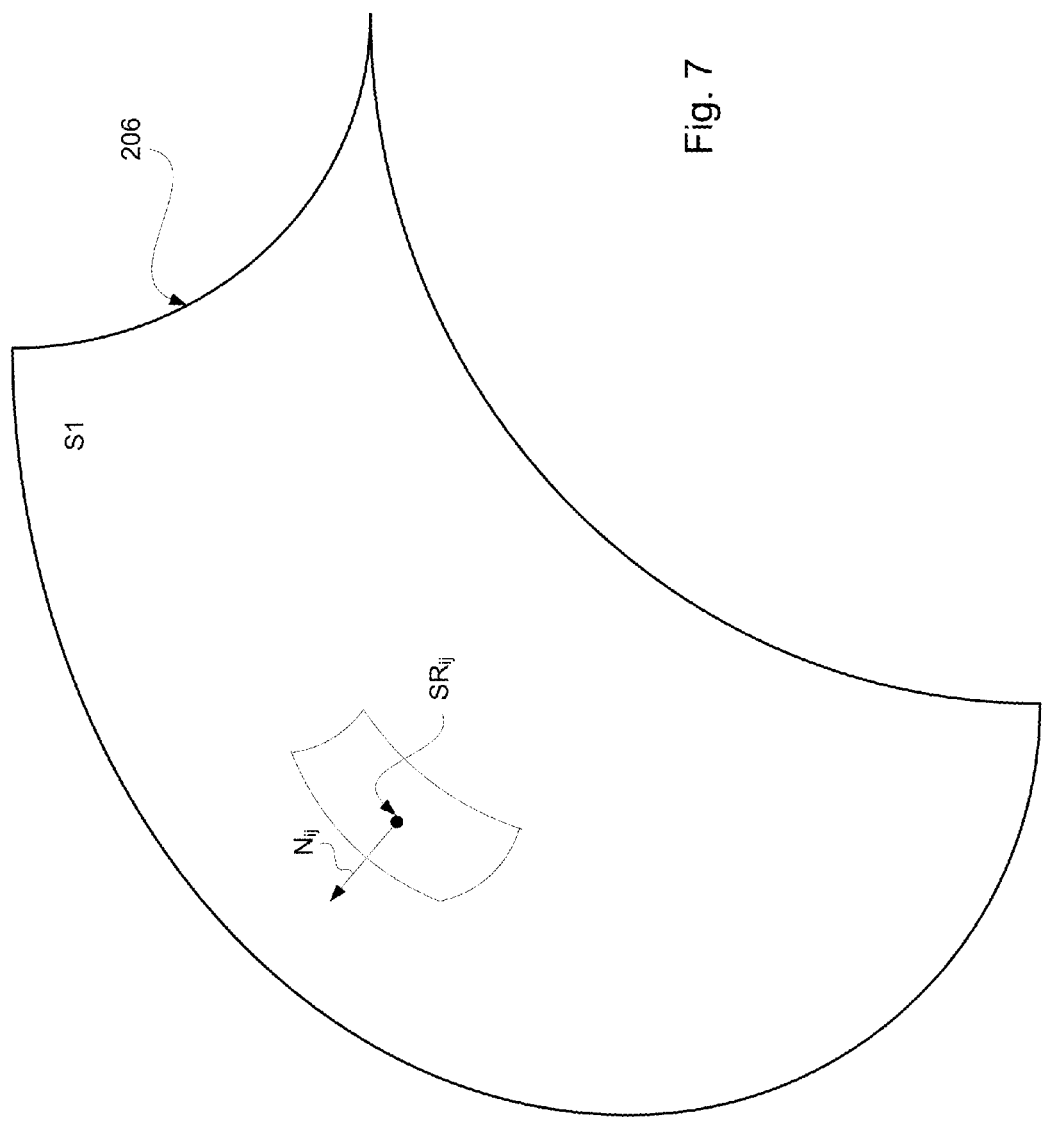
FIGS. 7-9 illustrate another, more automated approach to determining a virtual datum in accordance with the described embodiments.
Figure 8:
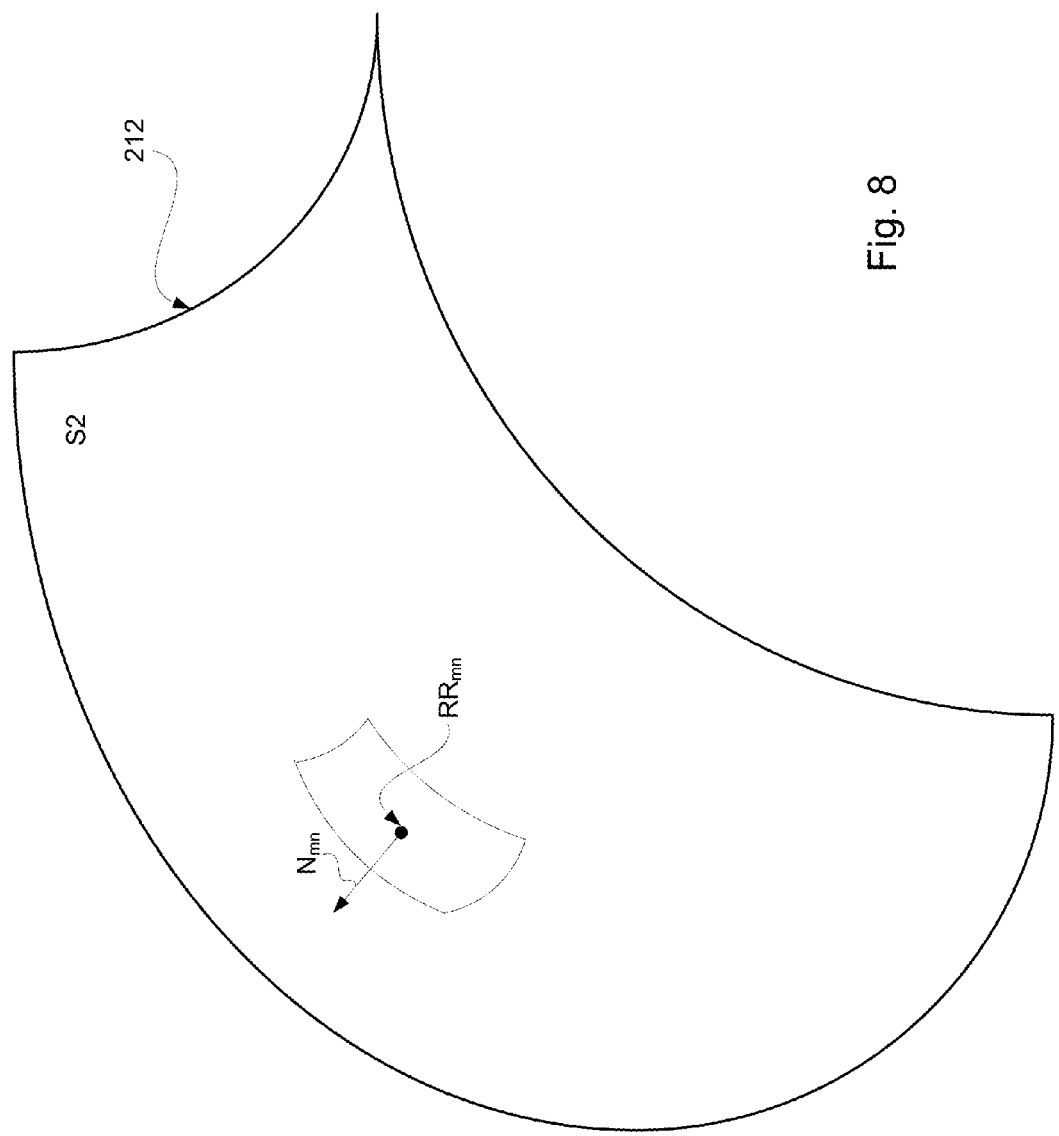
Figure 9:
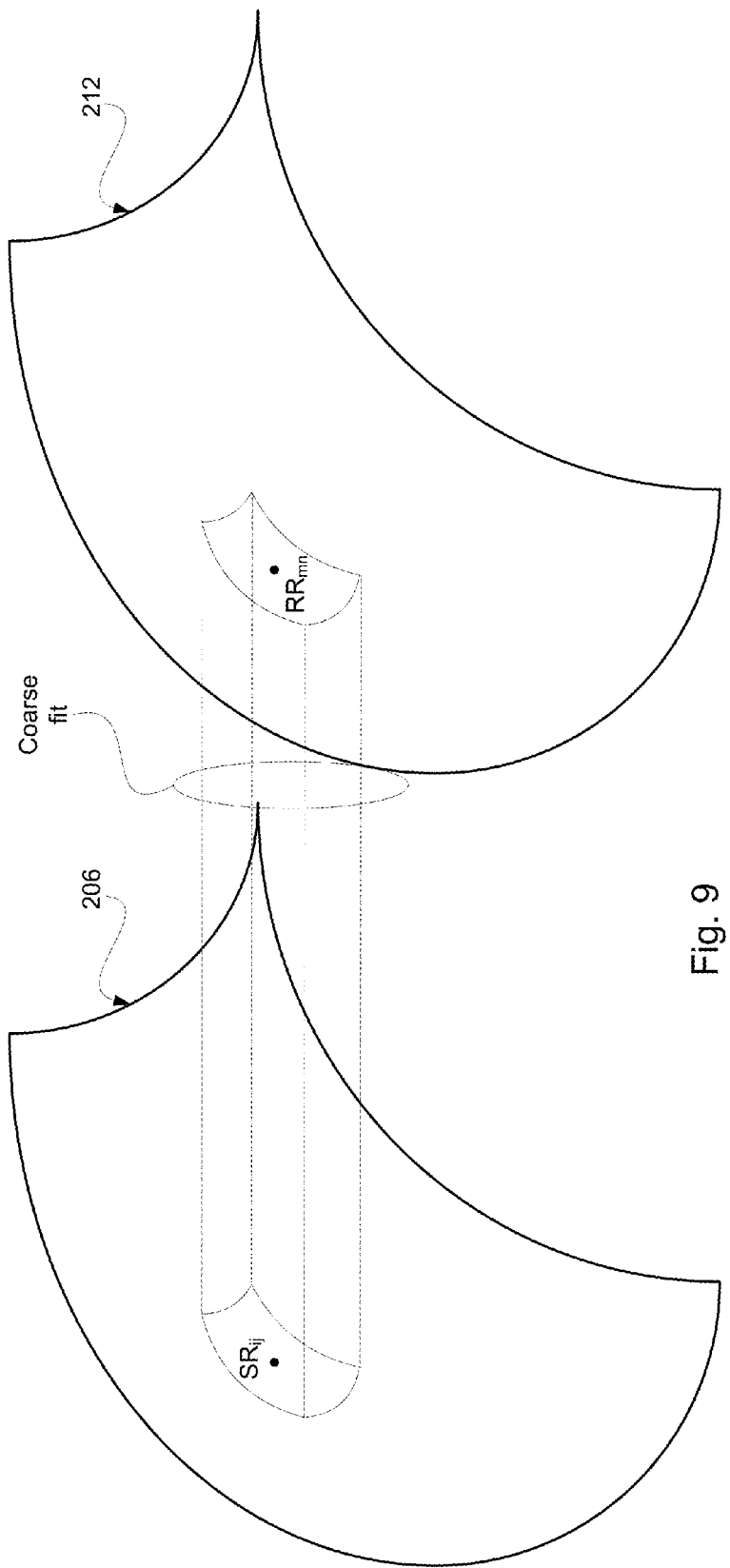

FIGS. 7-9 illustrate another, more automated approach to determining a virtual datum in accordance with the described embodiments. In this approach, a preliminary datum can be considered to be that region, or regions, of scanned image 206 that most closely matches the corresponding region, or regions, of reference image 212. Using this approach, in order to determine a preliminary datum, the surfaces $S_1$ and $S_2$ of scanned image 206 and the reference image 212, respectively, can be apportioned into a plurality of regions SR as shown in FIG. 7 for scanned image 206 and regions RR as shown in FIG. 8 for reference image 212. It should be noted that the number and locations of regions into which the images are apportioned can be manually selected. The more regions selected the smaller will be the area of each region, and conversely, the fewer regions selected the larger will be the area of each region. Larger regions provide more coarse registration of scanned image 206 to reference image 212 and smaller regions allow for finer the registration of scanned image 206 to reference image 212.

In the described embodiment, data representing the regions can be identified by its center position $SR_{ij}$ for scanned image 206 and $RR_{mn}$ for reference image 212 and their respective normal vectors $N_{ij}$ and $N_{mn}$. It should be noted, however, that other schemes for representing regions are possible, including schemes which define regions differently than using the center point or define the center point differently, but still remain within the scope of the present invention. However, a particular region can be uniquely identified once a center point P and a corresponding normal vector are established.

In order to determine a preliminary datum, a coarse fit can be performed between corresponding regions for the reference image and the scanned image. By coarse fit it can be meant that a least squares fit can be performed between corresponding points of each region. Those regions having the least error can be considered to have the highest confidence and thereby be used as a preliminary datum.

Figure 10:
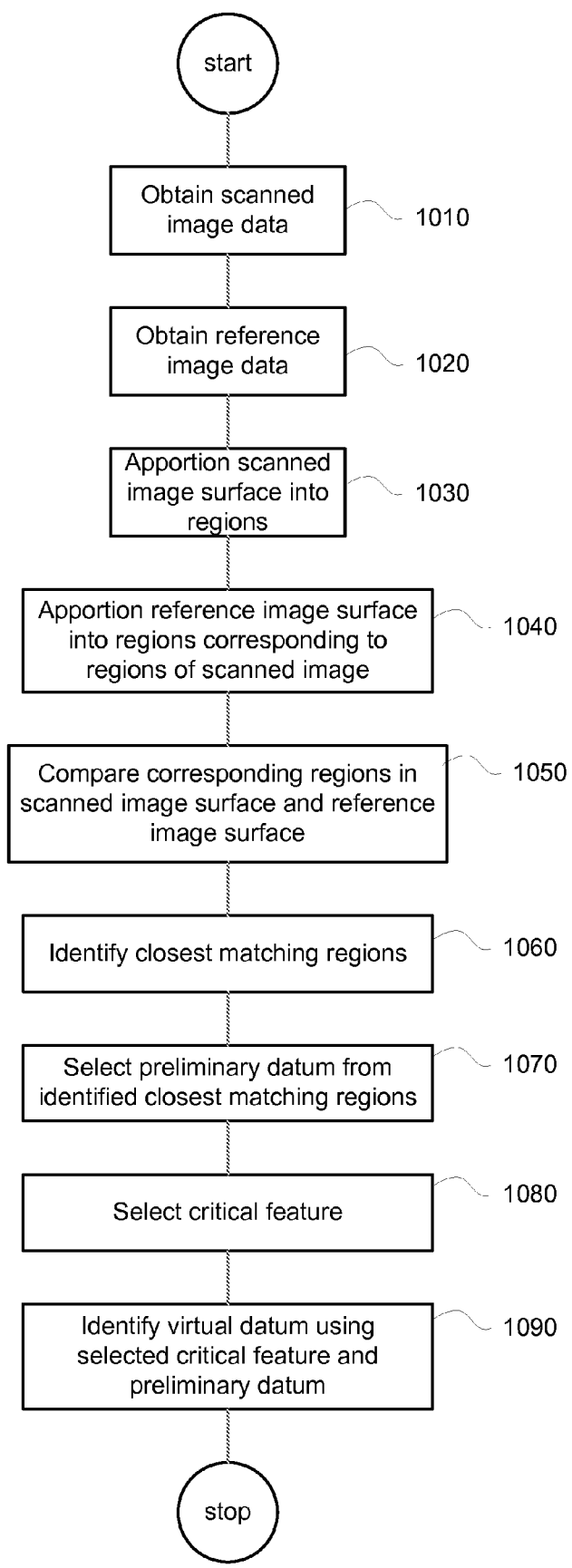
FIG. 10 shows a representative process for determining a virtual datum for an object having a complex shape in accordance with the described embodiments.

FIG. 10 shows a representative process 1000 for determining a virtual datum for an object having a complex shape in accordance with the described embodiments. Process 1000 can be performed by at least obtaining scanned image data at 1010 of the 3-D object. The scanned image data can be obtained in any number of ways, not the least of which is by contact methods such as CMMs, or more likely by non-contact methods that can include digital photography, MRI scans, etc. The scanned image data can then be ported to a processing/storage device such as a computer for processing.

At 1020, reference image data can be obtained. The reference image data is that data that can be used to confirm the dimensional accuracy of the scanned object. In this regard, the reference image data can be derived from a CAD drawing, an original model of the object, and so on. Once both the reference image and scanned image data have been obtained, at 1030 the data representing the scanned image surface is apportioned into a number of regions. It should be noted that the size of each region is directly related to the number of regions into which the scanned image surface is apportioned. In some case, depending upon design and/or manufacturing considerations, a user can manually select both the size and locations of the regions. In this way, the user can take advantage of specific design and/or manufacturing knowledge. For example, if the user understands that certain regions of the surface are manufactured or fabricated using a well understood, repeatable and reliable process (such as CNC), then the user may want to select only those regions in contrast to regions fabricated using less reliable techniques such as deep draw.

Once the surface of the scanned image has been apportioned, the surface of the reference image is likewise apportioned at 1050. By likewise apportioned it is meant that the surface of the reference image is apportioned into regions that correspond to the regions of the scanned image. In this way, there can be essentially a one to one correspondence between the scanned image regions and the reference image regions. Next, at 1060, those regions of the scanned image and the reference image that most closely match each other are identified. By most closely matching it is meant that those regions that are most alike between the scanned image and the reference image. The determination of most alike can include, for example, performing a coarse alignment between the two regions using a least squares fit. In other cases, the curvatures of the regions can be measured and compared where in other cases, the regions can be compared by the relationship between adjacent regions. The user has essentially complete freedom in choosing the definition of "closest matching".

Once the closest matching regions have been identified, then a preliminary datum is selected at 1070. The preliminary datum provides a starting point for determining the virtual datum. It should be noted that in some cases there may be a number of possible preliminary datum available to choose from such that an iterative process may be necessary. In any case, once a preliminary datum has been selected, a critical feature identified by the user at 1080 and in combination with the preliminary datum, a virtual datum is identified at 1090.

FIG. 11 illustrates a representative complex shape 1100 and the corresponding virtual datum comprising an XY reference plane and the critical dimension Z in accordance with a described embodiment.

The various aspects, embodiments, implementations or features of the invention can be used separately or in any combination. The invention is preferably implemented by hardware, software or a combination of hardware and software. The software can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices. The computer readable medium can also be distributed over network-coupled computer systems so that the computer readable code is stored and executed in a distributed fashion.

While this invention has been described in terms of several preferred embodiments, there are alterations, permutations, and equivalents, which fall within the scope of this invention. It is therefore intended that the following appended claims be interpreted as including all such alterations, permutations, and equivalents as fall within the true spirit and scope of the present invention.

What is claimed is:

1. A method for determining dimensional accuracy of a three dimensional (3-D) object having a complex shaped surface S in comparison to a reference image of the 3-D object, comprising:
    obtaining scanned image data of the object and apportioning a surface of the scanned image into a plurality of regions;
    obtaining reference image data of the object and apportioning a surface of the reference image into a plurality of regions, wherein each of the plurality of reference image regions corresponds to one of the plurality of scanned image regions;
    comparing corresponding regions of the scanned image and the reference image and identifying a closest matching region based upon the comparing;
    determining a virtual datum based on the closest matching region and a critical feature;
    aligning the scanned image data and the reference image data using the virtual datum; and
    comparing the scanned image and the reference image.

2. The method as recited in claim 1, wherein the surface S is formed of essentially all spline curves.

3. The method as recited in claim 1, wherein the scanned image data of the object is obtained using optical sensors.

4. The method as recited in claim 1, wherein the surface of the scanned object used to create the plurality of scanned image regions is limited to surfaces of the object fabricated using the most repeatable manufacturing process.

5. The method as recited in claim 1, wherein each of the plurality of scanned image regions and reference image regions are represented by a center position and a normal vector.

6. The method as recited in claim 5, wherein comparing corresponding regions of the scanned image and the reference image to identify a closest matching region further comprises performing a least squares fit between the corresponding center positions and normal vectors of each region.

7. A system for determining the dimensional accuracy of a three dimensional (3-D) component having a spline curved surface S, comprising:
    a processing unit;
    a scanning unit in communication with the processing unit and configured to scan a surface of the 3-D component and provide scanned image data; and
    a data storage unit in communication with the processing unit and configured to store reference image data and the scanned image data;
    wherein the processing unit compares the scanned image data to the reference image data by apportioning the scanned image data and reference image data into a plurality of corresponding regions, comparing the corresponding regions to identify a closest matching region, determining a virtual datum based on the closest matching region and a critical feature, and aligning the scanned image data to the reference image data using the virtual datum.

8. The system as recited in claim 7, wherein the critical feature is based upon a critical design/manufacturing consideration of the 3-D object.

9. The system as recited in claim 7, wherein the scanning unit further comprises a coordinate measurement machine (CMM).

10. The system as recited in claim 7, wherein the scanning unit further comprises a laser and optical sensors capable of measuring the 3-D component using stereo triangulation.

11. The system as recited in claim 7, wherein the scanning unit further comprises a magnetic resonance imaging (MRI) machine.

12. A system for determining the dimensional accuracy of a 3-D object having a complex shape, comprising:
   a chuck for securing the 3-D object;
   a scanning device for scanning a surface of the 3-D object while secured in the chuck, wherein the scanning device generates scanned image data; and
   a computing system having at least a user interface, a processor and a memory, wherein the memory stores reference image data corresponding to a reference image of the 3-D object, and wherein the scanning device sends the scanned image data to the memory for storage;
   wherein the computing system registers the scanned image data to the reference image data using a virtual datum derived by apportioning the scanned image data and the reference image data into a plurality of corresponding regions, comparing the corresponding regions to identify a closest matching region, and determining the virtual datum based on the closest matching region and a critical feature.

13. The system as recited in claim 12, wherein the user interface allows the critical feature to be identified by a user of the system.

14. The system as recited in claim 12, wherein the user interface is configured to allow a user of the system to select a size and number of corresponding regions.

15. A non-transitory computer readable medium for storing computer code used by a processor for determining dimensional accuracy of a three dimensional (3-D) object having a complex shaped surface S in comparison to a reference image of the 3-D object wherein the surface S is formed of essentially all spline curves, comprising:
   computer code for obtaining scanned image data of the object and apportioning a surface of the scanned image into a plurality of regions;
   computer code for obtaining reference image data of the object and apportioning a surface of the reference image into a plurality of regions, wherein each of the plurality of reference image regions corresponds to one of the plurality of scanned image regions;
   computer code for comparing corresponding regions of the scanned image and the reference image and identifying a closest matching region based upon the comparing;
   computer code for determining a virtual datum based on the closest matching region and a critical feature;
   computer code for aligning the scanned image data and the reference image data using the virtual datum; and
   computer code for comparing the scanned image and the reference image.

16. The non-transitory computer readable medium as recited in claim 15, wherein the computer code for apportioning a surface of the scanned image into a plurality of regions defines each of the plurality of regions by calculating a center point and normal vector.

17. The system as recited in claim 12, wherein the computing system identifies the closest matching region by performing a least squares fit between corresponding center positions and normal vectors of each set of corresponding regions.

* * * * *

UNITED STATES PATENT AND TRADEMARK OFFICE
CERTIFICATE OF CORRECTION

| | | |
|---|---|---|
| PATENT NO. | : 8,526,705 B2 | Page 1 of 1 |
| APPLICATION NO. | : 12/482246 | |
| DATED | : September 3, 2013 | |
| INVENTOR(S) | : Lancaster et al. | |

It is certified that error appears in the above-identified patent and that said Letters Patent is hereby corrected as shown below:

On Title page, Item [54] and in the Specification at Column 1, lines 1 and 2, Title "DRIVEN SCANNING ALIGNMENT FOR COMPLEX SHAPES" should read

--DESIGN DRIVEN SCANNING ALIGNMENT FOR COMPLEX SHAPES--.

Signed and Sealed this
Nineteenth Day of November, 2013

Teresa Stanek Rea
*Deputy Director of the United States Patent and Trademark Office*